July 15, 1941.  H. P. KUEHNI  2,249,477
ELECTRIC GAUGE
Filed Aug. 24, 1940
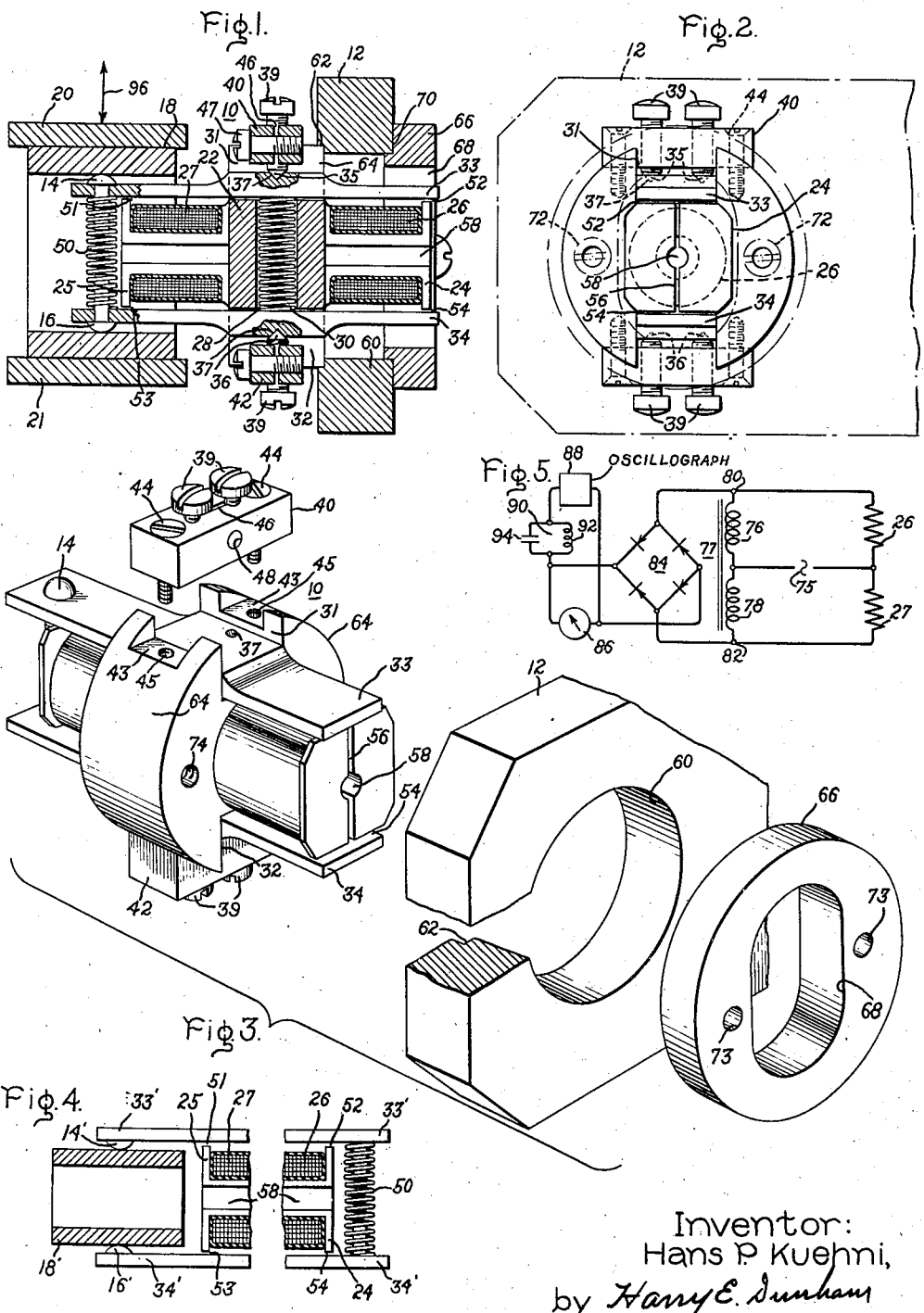
Inventor:
Hans P. Kuehni,
by Harry E. Dunham
His Attorney.

Patented July 15, 1941

2,249,477

UNITED STATES PATENT OFFICE 2,249,477

ELECTRIC GAUGE

Hans P. Kuehni, Schenectady, N. Y., assignor to General Electric Company, a corporation of New York Application August 24, 1940, Serial No. 354,103

9 Claims. (Cl. 33—178)

This invention relates to electric gauges and more particularly to electric gauges of the electromagnetic type for determining dimensions of a machined part, such for example, as the external diameter of a cylindrical member or the internal diameter of a hollow cylindrical member, and has for an object the provision of a simple, reliable and improved device of this character.

It is another object of my invention to provide an electric gauge of the foregoing character adapted to measure static and dynamic deformations in bodies under stress conditions.

It is a further object of my invention to provide an electromagnetic gauge adapted for measuring the internal diameter of a hollow cylindrical member or the external diameter of hollow or solid cylindrical bodies.

It is another object of my invention to provide an electric gauge of the electromagnetic type in which a small displacement of the test piece with respect to the gauge supporting means does not appreciably affect the gauge indications.

In carrying out my invention in its preferred form I provide a gaugehead having a body portion which includes at each end a spool-like portion of magnetic material on which is wound an electrical coil. Positioned on diametrically opposite sides of the body portion are a pair of spaced and relatively movable armature elements which are pivotally mounted intermediate their ends and which cooperate with the magnetic core sections about which the coils are wound. The armature members are spring-biased apart at one end thereof to cause the diametrically opposed contact points of the gauge to contact the internal or external wall of the cylindrical body to be gauged as the case may be. The gauge coils are adapted to be connected in a Wheatstone bridge circuit. The foregoing arrangement permits movement of the test body in a plane parallel to the gauge contact points and relative to the gaugehead support without appreciably affecting the measurement results.

The novel features which are characteristic of my invention are set forth with particularity in the appended claims. My invention itself, however, both as to its organization and method of operation together with further objects and advantages thereof may best be understood by reference to the following description taken in connection with the accompanying drawing.

In the drawing Fig. 1 is a longitudinal elevational view, partly in section, of an electric gauge constructed in accordance with the principles of my invention and mounted in position for measuring the internal diameter of a cylindrical machined part. Fig. 2 is an end elevation view of the arrangement of Fig. 1 with the gaugehead supporting means shown in dotted lines in order not to obscure the main portion of the gaugehead. Fig. 3 is an exploded perspective view of the arrangement shown in Figs. 1 and 2. Fig. 4 is a view corresponding to Fig. 1 and illustrating a modified arrangement of the apparatus of Figs. 1 to 3 wherein the principles of my invention are applied to an electric gauge adapted for measuring the outside diameter of cylindrical bodies. Fig. 5 is a diagram of electrical connections which shows a manner of connecting the gauge coils in an electrical circuit for obtaining electrical indications in accordance with the dimensions of the body under test.

Referring to Figs. 1 to 3, I have illustrated an electromagnetic gauge constructed in accordance with my invention and, in order better to explain its operation, I have shown it mounted in position for measuring the internal diameter of a hollow cylindrical member, such as a machined part, which is subjected to static and dynamic stresses. In the drawing, the numeral 10 designates the gaugehead supported in the measuring position by means of a bracket member 12 and with a pair of diametrically opposed diamond points or contact portions 14 and 16 in engagement with the internal surface of a hollow cylindrical member or part 18 which is mounted in supporting members 20 and 21. For purposes of illustration it may be considered that the static and dynamic stresses are applied to the body 18 through the members 20 and 21. The gaugehead 10 comprises a body portion including an intermediate section 22 on opposite sides of which are formed spool-like portions 24 and 25 about which are wound electrical coils 26 and 27, respectively. The central portion or intermediate section 22 is provided with a transverse cylindrical bore 28 which is adapted to receive a helical spring 30. The spring 30 is preferably composed of non-magnetic material. Seated freely in longitudinal grooves 31 and 32 formed in the body portion at opposite ends of the cylindrical bore 28 and in transverse relation thereto are a pair of spaced magnetic armature members 33 and 34, which are pivotally mounted at their intermediate portions by means of two pairs of pivots 35 and 36, respectively, each pivot being adapted to seat in separate recesses 37 formed in the outer surface of the armature elements. While I have shown two conical recesses 37 in each armature member for receiving the contact points or pivots, in order to simplify the assembly of the apparatus and avoid the necessity of highly accurate machining operations, I may provide only one conical recess and make the other recess in the form of a V-shaped groove. It will also be appreciated that the members 33 and 34 need not be composed entirely of magnetic material. The armature elements are maintained in engagement with the pivots and in spaced relation with the intermediate section 22 of the body portion by means of the helical spring 30.

The pivot portions 35 and 36 are formed on the ends of screws 39 which are adjustably mounted in blocks 40 and 42 adapted to be mounted transversely of the armature elements 33 and 34, respectively, and positioned on supporting surfaces 43 formed in the body portion of the gaugehead where they are securely held by a plurality of screws 44 which engage the threads of recesses 45. The screws 39 are preferably composed of a non-magnetic material with a hard tip portion. Each of the blocks 40 and 42 is provided with a slitted portion 46 which with the aid of a transverse lock screw 47 engaging a threaded opening 48 serves as a means of applying pressure to the screws 39 to lock them securely against rotational movement.

A resilient member such as a helical spring 50, which is preferably made of non-magnetic material and positioned opposite the magnetic core 25 and between the armature members 33 and 34, serves to bias the diametrically opposed contact points 14 and 16 into engagement with the internal surface of the body 18 under test. The armature 33 cooperates with the cores 25 and 26 to form air gaps 51 and 52, respectively, which vary in opposite senses upon pivotal movement of the armature. Similarly, the armature 34 forms oppositely varying air gaps 53 and 54 with these respective cores.

In the formation of the armature elements 33 and 34 and the cores 24 and 25, I prefer to employ a magnetic material which has a relatively high permeability and high resistivity, such for example as certain well known nickel-iron alloys. Since the coils 26 and 27 will be energized from an alternating current source of supply, as will be later explained, the flux penetration into the solid magnetic material is only partial and, therefore, in order to increase the flux carrying area I prefer to provide a longitudinal slit 56 in the end of each of the spools or cores 24 and 25. Also, in order still further to increase the effective flux carrying area of the hub portions of the cores, I preferably provide a central longitudinal bore 58 in each core or spool.

In order rigidly to support the gaugehead 10 in the measuring position, I provide an annular opening 60 in the supporting member or bracket 12 of sufficient size to permit the right-hand portion of the gaugehead to be positioned therein without interfering with the motion of the armature elements. The bracket 12 is also provided with an annular notch or rabbet 62 about the opening 60 in which are positioned the arcuate sections 64 of the body portion of the gaugehead. A clamping ring 66 having an opening 68 formed therein is adapted to fit over the right-hand end of the gaugehead and is also provided with an annular notch 70 which cooperates with the opening in the bracket member 12. A plurality of screws or studs 72 adapted to pass through openings 73 of the ring 66 engage the threads of openings 74 formed in the body portion of the gaugehead and serve to clamp the parts securely together. The foregoing supporting arrangement permits the gaugehead to be clamped in any desired position for taking measurements throughout a range of 360 degrees.

In Fig. 4, I have illustrated a modification showing a partial sectional view corresponding to Fig. 1 of a gaugehead constructed in accordance with my invention and adapted to the measurement of the outside diameter of a cylindrical body 18'. In the arrangement illustrated corresponding reference characters are employed to designate corresponding parts of the arrangements shown in Figs. 1 to 3. The helical biasing spring 50 is in this case mounted between the armature members 33' and 34' at the opposite end of the gaugehead from that shown in Fig. 1. The diamond contact points 14' and 16' are in this case positioned inside the armature elements 33' and 34' facing each other and biased in contact with the outer surface of the cylindrical body 18' by means of the spring 50. In view of the description of the foregoing arrangements, a detailed description of the apparatus of Fig. 4 is believed to be unnecessary.

In order to obtain electrical indications proportional to the spacing between the contact portions 14 and 16 of Fig. 1 or the contact portions 14' and 16' of Fig. 4, I have shown in Fig. 5 an electrical circuit diagram wherein the gauge coils 26 and 27 are connected in adjacent arms of a Wheatstone bridge circuit. A source of alternating voltage 75 is connected to energize the bridge which comprises two differentially-connected electrical circuits one of which includes a section 76 of a differential reactor 77 or transformer and the gauge coil 26 and the other of which comprises a section 78 of the differential reactor and the gauge coil 27. The source of supply 75 will be of a frequency the magnitude of which is determined by the measurements under investigation, as will be well understood by those skilled in the art, in order that the supply frequency will not affect the measurement results.

The conjugate portion of the bridge circuit as represented by the points 80 and 82 may be connected to the input circuit of a suitable amplifier but for simplicity I have shown these points connected directly to the input terminals of a full wave rectifier element 84, the output terminals of which may be connected to a suitable direct current responsive instrument 86. If it is desired to record the variations in the internal diameter of the body under test, a recording element such, for example, as an oscillograph 88 may be connected to the output terminals of the rectifier 84. Suitable filtering means 90 comprising an inductance element 92 and a capacitor element 94 may be connected in circuit with the oscillograph element for filtering out any objectionable double frequency components or other harmonic disturbances emanating from the supply source.

Assuming, for example, that it is desired to measure the internal diameter of the body 18, a gaugehead of the proper size is mounted in position with its contact elements 14 and 16 engaging the internal surface of the body 18. Relative movement of the armature elements 33 and 34 will affect unequally the reactance of the coils 26 and 27, as will be well understood, thereby causing a proportionate unbalance of the bridge and corresponding changes in the indications of the current responsive devices 86 and 88. It will be appreciated, however, that slight movement of the test piece up or down in the direction of the arrow 96 relative to the bracket 12 and in a plane parallel to the latter member will not appreciably affect the measurement results. To illustrate this feature assume that the supporting members 20 and 21 are moved upwardly the same distance by a slight amount. The result is an increase in the air gaps 51 and 54 and a decrease in the air gaps 52 and 53. Under such conditions the magnetic circuits of the coils 26 and 27 are affected in the same way with the result that there will be no appreciable effect on the degree of balance or unbalance of the Wheatstone bridge. To upset a given condition or degree of balance of the bridge it is necessary that the relative spacing between the armatures on each side of the pivot point be altered so that the reluctance of the magnetic circuits or the reactance of the coils will be affected in a different manner.

In the operation of the gauge, it is preferred to operate the bridge in the unbalanced condition for the zero reference point. The instrument scale may be such that the indicator points to zero for a standard size part in the case where deviations from a standard dimension are to be observed, or the scale may be calibrated in terms of actual dimensions.

In order to adapt the device of Figs. 1 to 3 to the measurement of test bodies of larger diameter it is merely necessary to employ contact points 14 and 16 which extend a greater distance from the armature elements 33 and 34. The same is true as to the spacing between the contact points 14' and 16' of the apparatus shown in Fig. 4 in order that smaller parts may be measured.

While I have illustrated and described the apparatus of my invention in connection with the measurement of the internal and external diameters of cylindrical bodies, I wish to point out that such measurements merely represent a useful field of application and that the apparatus may also be applied to the measurement of other machined parts or bodies. It will be appreciated that since each of the coils 26 and 27 link a pair of parallel magnetic circuits, a similar result may be obtained by employing separate magnetic circuits magnetized by separate series connected coils. Other arrangements will no doubt occur to those skilled in the art.

In accordance with the provisions of the patent statutes, I have described the principles of operation of my invention together with the apparatus which I now consider to represent the best embodiments thereof but I desire to have it understood that the apparatus shown and described is only illustrative and that the invention may be carried out by other means.

What I claim as new and desire to secure by Letters Patent of the United States is:

1. In an electric gauge for measuring dimensions of bodies, a support, a pair of spaced members mounted on said support for pivotal movement with respect thereto, said members having portions of magnetic material and contact portions adapted to be spaced apart in accordance with the dimension of the body to be measured, means composed of magnetic material associated with said support and cooperating with the magnetic portions of said members to form air gaps, said air gaps being variable in accordance with relative movements of said members and said magnetic material means, current conducting winding means for exciting the magnetic circuits including said magnetic material means and the magnetic portions of said members, the reactance of said winding means being changed in response to variation of said air gaps, an alternating current bridge circuit including said winding means, and current responsive means energized in accordance with the unbalance of said bridge circuit to measure the relative displacement of said contact portions.

2. In an electric gauge for measuring dimensions of bodies, supporting means, a pair of members supported by said supporting means and each arranged for independent movement with respect thereto, said members including portions of magnetic material and having contact portions adapted to be spaced apart an amount determined by the dimension of the body to be measured, magnetic means extending from said supporting means between said members to form air gaps between said magnetic portions of said members and said extending magnetic means, said air gaps being variable in accordance with relative displacements of said magnetic material means and the magnetic portions of said members, means for producing magnetic flux in the magnetic circuits including said magnetic material means and the magnetic portions of said members, the magnitude of said magnetic fluxes being variable in response to changes in said air gaps, an electrical circuit including said flux producing means and adapted to be energized from a source of alternating current, and electro-responsive means connected in said circuit and operable in accordance with changes in the relative magnitudes of the fluxes in said magnetic circuits to measure the relative displacement of said contact portions.

3. In combination in an electric gauge for measuring dimensions of machined parts and the like, supporting means, a pair of movable work contacting portions pivotally mounted on said supporting means, members of magnetic material movable with said contacting portions, said contact portions being spaced apart and adapted to engage the part at points corresponding to the dimension to be gauged, magnetic circuit means spaced from said magnetic members to form variable air gaps therewith, electrical coil means adapted to magnetize said magnetic circuit means and said magnetic members, current responsive means associated in an electrical circuit with said coil means and responsive to relative displacements of said contact portions, said air gaps being on either side of the pivot points of said members so that relative displacement of said support and the body to be measured will effect diametrically opposite gaps in a similar manner so that said current responsive means is substantially independent over a wide range of the relative position of the body under test and said supporting means.

4. In an electric gauge for measuring the diameter of bodies, supporting means, a pair of spaced magnetic armatures, contact portions mounted in fixed relation with said armatures and adapted to engage diametrically opposite points on the body under test, means for pivotally mounting each of said armatures at points intermediate their end portions for freedom of movement with respect to said supporting means, magnetic circuit elements forming air gaps with each of said armatures on opposite sides of said pivot points, electrical coil means for exciting the magnetic circuits included by said magnetic circuit elements and said armatures, the reactance of portions of said coil means being variable in accordance with changes in the respective air gaps associated therewith, an alternating current circuit including said coil means, and means responsive to current variations in said circuit.

5. In an electric gauge for measuring a dimension of a body, a pair of spaced members, a supporting means, means for pivotally mounting each of said members to said supporting means at points intermediate their end portions, each of said members comprising magnetic material on each side of its pivot point, a contact member secured in fixed relation to each of said members, said contact members being adapted to be spaced apart an amount determined by the dimension to be measured, a plurality of magnetic circuit portions, said magnetic circuit portions being arranged to cooperate with the magnetic material of said pivoted members and forming air gaps therewith, the respective air gaps formed on opposite sides of the pivot point between said magnetic circuit portions and the magnetic material of each of said members varying in opposite senses upon pivotal movement of said members, electrical coil means for producing magnetic fluxes in each magnetic circuit portion and the associated magnetic material of said pivoted members, an alternating current circuit including said electrical coil means, and current responsive means connected to said alternating current circuit.

6. In an electric gauge for measuring the diameter of cylindrical parts, a pair of spaced members, a supporting means, each of said members being pivotally mounted with respect to said supporting means at a point intermediate its end portions and said members being free to move with respect to each other, each of said members including magnetic material in the portions thereof lying on opposite sides of its pivot point, a contact portion secured in fixed relation to each of said members, said contact portions being adapted to engage the body under test at spaced points determined by the dimension to be gauged, means composed of magnetic material adapted to form air gaps on each side of the pivot point with the magnetic material of each of said members, the air gaps positioned on opposite sides of said pivot point and controlled by the movement of one of said members being varied in opposite senses upon pivotal movement of said member, the air gaps positioned on opposite sides of said pivot point and controlled by the movement of the other of said members being varied in opposite senses upon pivotal movement of said other member, a first electrical winding means for producing magnetic flux in the magnetic circuits included by said magnetic material means and the magnetic material of said members located on one side of said pivot points, a second electrical winding means for producing magnetic flux in the magnetic circuits included by said magnetic material means and the magnetic material of said members located on the other side of said pivot points, an alternating current bridge circuit, said first and second winding means being connected in adjacent legs of said bridge circuit so that the condition of balance of said bridge is substantially unaffected by movement of said pivoted members the same amount and in the same direction, and means responsive to the unbalance of said bridge circuit for measuring the distance between said contact portions.

7. In a gauge of the electromagnetic type for measuring the diameter of cylindrical bodies, a gaugehead comprising a central portion, magnetic cores secured to opposite ends of said central portion, an electrical coil wound about each of said magnetic cores, said central portion having a transverse opening formed therein, a pair of spaced armature elements cooperating to form air gaps with said magnetic cores one of which is mounted transversely and at each end of said opening, means in alignment with said opening for pivotally mounting said armature elements, resilient means positioned in said opening for biasing said armature elements into engagement with said pivot means, said armature elements being provided with a pair of diametrically opposed contact points, means urging said contact points into engagement with the surface of a cylindrical body whose diameter is to be measured, means connecting said electrical coils in differentially opposed alternating current electrical circuits, and means responsive to unequal changes in the reactance of said coils as determined by the relative displacement between said contact portions.

8. In an electric gauge for measuring the diameter of cylindrical parts, a pair of spaced magnetic armatures having diametrically opposed contact portions adapted to engage the cylindrical part whose diameter is to be measured, a supporting means, means for pivotally mounting each of said magnetic armatures to said supporting means at points intermediate their end portions, a plurality of magnetic members, electrical coil elements adapted to magnetize said magnetic members, each armature being mounted in cooperating relation to form air gaps on each side of its pivot point with each of said magnetic members, means for energizing said electrical coils, and means connected in an electrical circuit with said coils and responsive to the relative movement between said contact portions.

9. In a gauge of the electromagnetic type for measuring the dimensions of a body, a supporting means, a gaugehead comprising a central portion fixed to said supporting means, magnetic cores secured to opposite ends of said central portion, slits in each of said cores in order to increase the effective alternating flux carrying area thereof, an electrical coil associated with each of said magnetic cores, a pair of spaced armature members mounted respectively on opposite sides of said central portion and said magnetic cores, each of said armatures being pivotally mounted at its intermediate portion with respect to said supporting means, each of said armatures being further arranged to form air gaps with each of said cores, which air gaps vary in opposite senses upon pivotal movement of said armature, a pair of contact portions, one of said contact portions being secured to each of said armature members and said contact portions being spaced apart an amount depending upon the dimension to be measured, means connecting said electrical coils in differentially opposed alternating current electrical circuits, and current responsive means associated with said electrical circuits and responsive to unequal changes in the reactance of said coils as determined by the spacing between said contact portions.

HANS P. KUEHNI.